United States Patent
Lin (10) Patent No.: US 10,628,929 B2
(45) Date of Patent: Apr. 21, 2020

(54) METHOD AND COMPUTER SYSTEM OF IMAGE ENHANCEMENT

(71) Applicant: MultiTek Inc., Hsinchu (TW)

(72) Inventor: Chin-An Lin, Taipei (TW)

(73) Assignee: Augentix Inc., Hsinchu (TW)

( * ) Notice: Subject to any disclaimer, the term of this patent is extended or adjusted under 35 U.S.C. 154(b) by 221 days.

(21) Appl. No.: 15/990,794

(22) Filed: May 28, 2018

(65) Prior Publication Data

US 2019/0362475 A1  Nov. 28, 2019

(51) Int. Cl.
| | |
|---|---|
| *G06T 5/00* | (2006.01) |
| *G06T 7/90* | (2017.01) |
| *G06T 5/40* | (2006.01) |
| *G06T 5/50* | (2006.01) |

(52) U.S. Cl.
CPC .............. *G06T 5/009* (2013.01); *G06T 5/002* (2013.01); *G06T 7/90* (2017.01); *G06T 5/40* (2013.01); *G06T 5/50* (2013.01); *G06T 2207/10024* (2013.01); *G06T 2207/20182* (2013.01)

(58) Field of Classification Search
CPC ... G06T 5/007–009; G06T 5/002; G06T 5/40; G06T 5/50; G06T 7/90; G06T 2207/10024; G06T 2207/20182; H04N 5/235–243; H04N 5/2356; H04N 5/23229
See application file for complete search history.

(56) References Cited

U.S. PATENT DOCUMENTS

| | | | |
|---|---|---|---|
| 7,265,784 B1* | 9/2007 | Frank | H04N 5/2351 348/222.1 |
| 2003/0025838 A1* | 2/2003 | Kim | H04N 5/20 348/678 |
| 2003/0161549 A1* | 8/2003 | Lei | G06T 5/009 382/274 |
| 2004/0170316 A1* | 9/2004 | Saquib | H04N 1/4072 382/162 |
| 2007/0041636 A1* | 2/2007 | Yoon | G06T 5/009 382/169 |
| 2007/0196098 A1* | 8/2007 | Sugimoto | G03B 7/08 396/234 |
| 2009/0009665 A1* | 1/2009 | Tsutsumi | H04N 5/202 348/674 |
| 2010/0177203 A1* | 7/2010 | Lin | H04N 5/23229 348/222.1 |

(Continued)

FOREIGN PATENT DOCUMENTS

| | | |
|---|---|---|
| CN | 102693532 A | 9/2012 |
| CN | 103067661 A | 4/2013 |

(Continued)

*Primary Examiner* — Sean T Motsinger
(74) *Attorney, Agent, or Firm* — Winston Hsu (57) ABSTRACT

A method of image enhancement in a video, comprises acquiring a luminance statistics of an image; determining a boosting curve according to a target brightness and a brightness of the image; determining an enhancing curve according to a saliency distribution of a pixel brightness derived from the luminance statistics, to the target brightness and a noise level of the image; blending the boosting curve and the enhancing curve based on an enhance level to generate a control curve; and enhancing the image based on the control curve; wherein the control curve enhances the brightness and a contrast of the image.

14 Claims, 6 Drawing Sheets

(56) References Cited

U.S. PATENT DOCUMENTS

| | | | |
|---|---|---|---|
| 2010/0309346 A1* | 12/2010 | Brunner | H04N 5/202 348/254 |
| 2011/0013834 A1* | 1/2011 | Hsu | G06T 5/009 382/168 |
| 2011/0096988 A1* | 4/2011 | Suen | G06T 5/007 382/168 |
| 2011/0096989 A1* | 4/2011 | Narasimha | H04N 5/243 382/169 |
| 2011/0292246 A1* | 12/2011 | Brunner | G06T 5/009 348/231.99 |
| 2013/0129214 A1* | 5/2013 | Toda | H04N 1/407 382/167 |
| 2015/0071537 A1 | 3/2015 | Lim | |
| 2015/0110399 A1* | 4/2015 | Valdes Lopez | H04N 1/4074 382/167 |
| 2016/0232419 A1* | 8/2016 | Bai | G06T 5/007 |
| 2016/0284095 A1* | 9/2016 | Chalom | H04N 5/23229 |
| 2018/0035088 A1* | 2/2018 | Nose | H04N 5/23229 |
| 2018/0040306 A1* | 2/2018 | Arumugam | G09G 5/393 |
| 2019/0362475 A1* | 11/2019 | Lin | G06T 7/90 |
| 2019/0362476 A1* | 11/2019 | Pytlarz | G06T 5/009 |

FOREIGN PATENT DOCUMENTS

| | | |
|---|---|---|
| TW | 200822711 A | 5/2008 |
| TW | 200908727 A | 2/2009 |
| TW | 201222471 A1 | 6/2012 |
| TW | 201223293 A1 | 6/2012 |
| TW | 201612852 A | 4/2016 |

* cited by examiner

METHOD AND COMPUTER SYSTEM OF IMAGE ENHANCEMENT

BACKGROUND OF THE INVENTION

1. Field of the Invention

The present invention relates to a method and computing system of image enhancement, and more particularly, to a method and computing system of image enhancement capable of preserving more details for the image by enhancing brightness and contrast of the image.

2. Description of the Prior Art

With the development of the technology, all kinds of digital devices are provided. The demand of digital image and video enhancement technology for the industry increases. The image enhancement is to enhance quality, global contrast, detail, color appearance and so on of the image. In a conventional system, tone mapping and content-based enhancement are methods to enhance the image, wherein the tone mapping is a technique to render a new LDR image that approximate the appearance of high-dynamic-range (HDR) images. The content-based enhancement is a method to enhance details of the image based on the scene analysis. However, the conventional tone mapping and content-based enhancement are not easy to control its resulting brightness, contrast and noise at the same time, which magnifying existing differences or contrast of the images in a video.

Therefore, how to solve the problems mentioned above and provide a high quality image enhancement method to preserve more details of the images in a video has become an important topic.

SUMMARY OF THE INVENTION

It is therefore an object of the present invention to provide a method and computer system capable of preserving more details of the images in a video with conducted brightness and contrast, so as to improve the disadvantages of the prior art.

An embodiment of the present invention discloses a method of image enhancement in a video, comprising acquiring a luminance statistics of an image; determining a boosting curve according to a target brightness and a brightness of the image; determining an enhancing curve according to a saliency distribution of a pixel brightness derived from the luminance statistics, to the target brightness and a noise level of the image; blending the boosting curve and the enhancing curve based on an enhance level to generate a control curve; and enhancing the image based on the control curve; wherein the control curve enhances the brightness and a contrast of the image.

An embodiment of the present invention further discloses a computer system, comprising a processing device; and a memory device coupled to the processing device, for storing a program code instructing the processing device to perform a process of image enhancement in a video, wherein the process comprises acquiring a luminance statistics of an image; determining a boosting curve according to a target brightness and a brightness of the image; determining an enhancing curve according to a saliency distribution of a pixel brightness derived from the luminance statistics, to the target brightness and a noise level of the image; blending the boosting curve and the enhancing curve based on an enhance level to generate a control curve; and enhancing the image based on the control curve; wherein the control curve enhances a brightness and a contrast of the image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
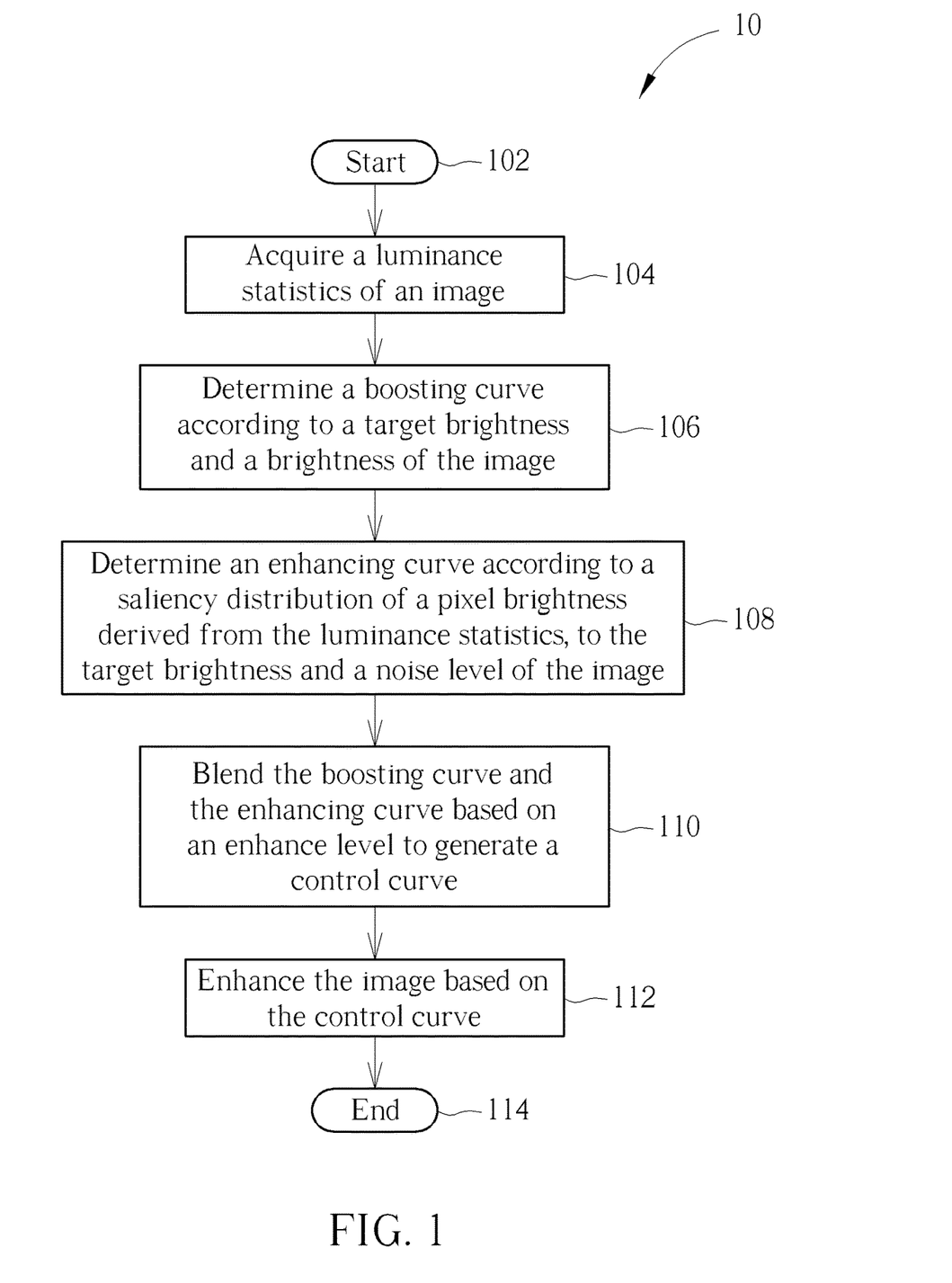
FIG. 1 is a schematic diagram of an image enhancement process according to an embodiment of the present invention.

Please refer to FIG. 1, which is a schematic diagram of an image enhancement process 10 according to an embodiment of the present invention. The image enhancement process 10 includes the following steps:

Step 102: Start.
Step 104: Acquire a luminance statistics of an image.
Step 106: Determine a boosting curve according to a target brightness and a brightness of the image.
Step 108: Determine an enhancing curve according to a saliency distribution of a pixel brightness derived from the luminance statistics, to the target brightness and a noise level of the image.
Step 110: Blend the boosting curve and the enhancing curve based on an enhance level to generate a control curve.
Step 112: Enhance the image based on the control curve.
Step 114: End.

According to the image enhance process 10, the control curve is determined to be applied on the image, so as to adjust the images in a video accordingly and enhance quality of the images, such as a global contrast, details or color appearance and so on, and thereby to preserve more details for the images in the video. First, in step 104, the luminance statistics of the image is acquired, wherein the image may be obtained from one or more capturing devices. In other words, the luminance statistics of the images for the image enhancement process 10 may be obtained from different sources of capturing devices, and statistically counted as the luminance statistics. In an embodiment, the luminance statistics may be a luminance histogram of pixels in the image, which determines how many pixels are within a given luminance value range, and further, determines what percentage such pixels represent in relative to the overall number of pixels within the image.

After a luminance statistics of the image is acquired, in step 106, the boosting curve is determined according to the relationship between the target brightness and the brightness of the image. The boosting curve is determined by a power function, and the brightness of the image is related to an intensity of pixels of the image. Notably, the boosting curve may be determined by other kinds of functions and not limited to the power function, and the target brightness may be determined by computer system or users. For example, the boosting curve may be a set of linear curves with different slopes. In an embodiment, the boosting curve is derived by equation (1):

$$f(x) \in \{f_0(x), f_1(x), \ldots, f_N(x)\},$$
$$f_i(x) = x^{i/N}, i \in \{0, 1, \ldots, \infty\}, x \in [0, 1]$$
$$\min_f \left( \sum_p f(I(p)) - \text{target brightness} \right) \quad (1)$$

In equation (1), p denotes the pixel of the image, x denotes the brightness of each pixel of the image, which is in a range of 0 to 1, I(p) denotes the intensity of the pixel, and f(x) denotes a set of the power functions of x. With the predetermined target brightness, the equation (1) determines the power function from the set of f(x), which minimizes a sum of differences between the intensity of the pixel and the target brightness, meaning that each pixel is closest to the target brightness. Therefore, the boosting curse enhances the image in the brightness if the brightness of the image is too dark or too bright.

Figure 2:
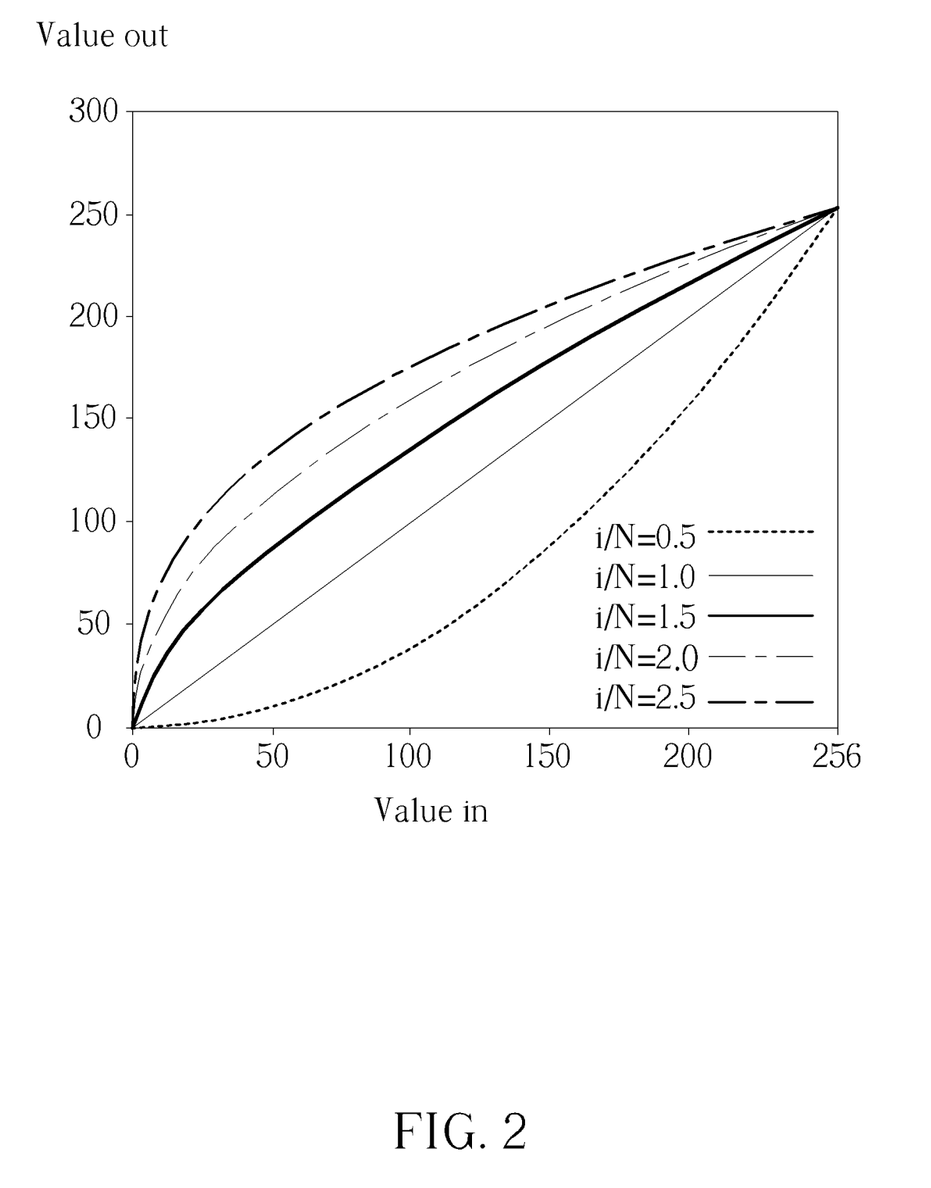
FIG. 2 is a schematic diagram of curves of power functions according to an example of the present invention.

In an embodiment, please refer to FIG. 2, which is a schematic diagram of curves of the power functions f(x) according to an example of the present invention. As shown in FIG. 2, each of the curves represents one of the power functions, and the boosting curve is determined by finding the power function, which minimizes the sum of the differences between the intensity of the pixel and the target brightness. As can be seen from FIG. 2, a dotted line is the curve of the power function when i/N is 0.5, which converts an input value of the luminance statistics into an output value of the luminance statistics. Similarly, other curves with different values of i/N of the power functions may be applied to convert the luminance statistics accordingly, so as to boost the brightness of the image. Noticeably, the boosting curve may be different when the target brightness varies, and the boosting curve is determined to boost the brightness of the image based on the target brightness.

Next, in step 108, the enhancing curve is determined according to the saliency distribution of the pixel brightness derived from the luminance statistics, to the target brightness and the noise level of the image. In detail, the saliency distribution of a pixel brightness of the image is derived from a power function of a luminance histogram of the image and a target noise, wherein the luminance histogram is related to the luminance statistics and is equalized or weighted for deriving the saliency histogram. In an embodiment, when the image is an 8-bit three-channel RGB image, each channel has 256 brightness values ranging from 0 to 255. The distribution of the luminance statistics of the image is equalized or weighted, such that the brightness of image is equalized or weighted.

Figure 3:
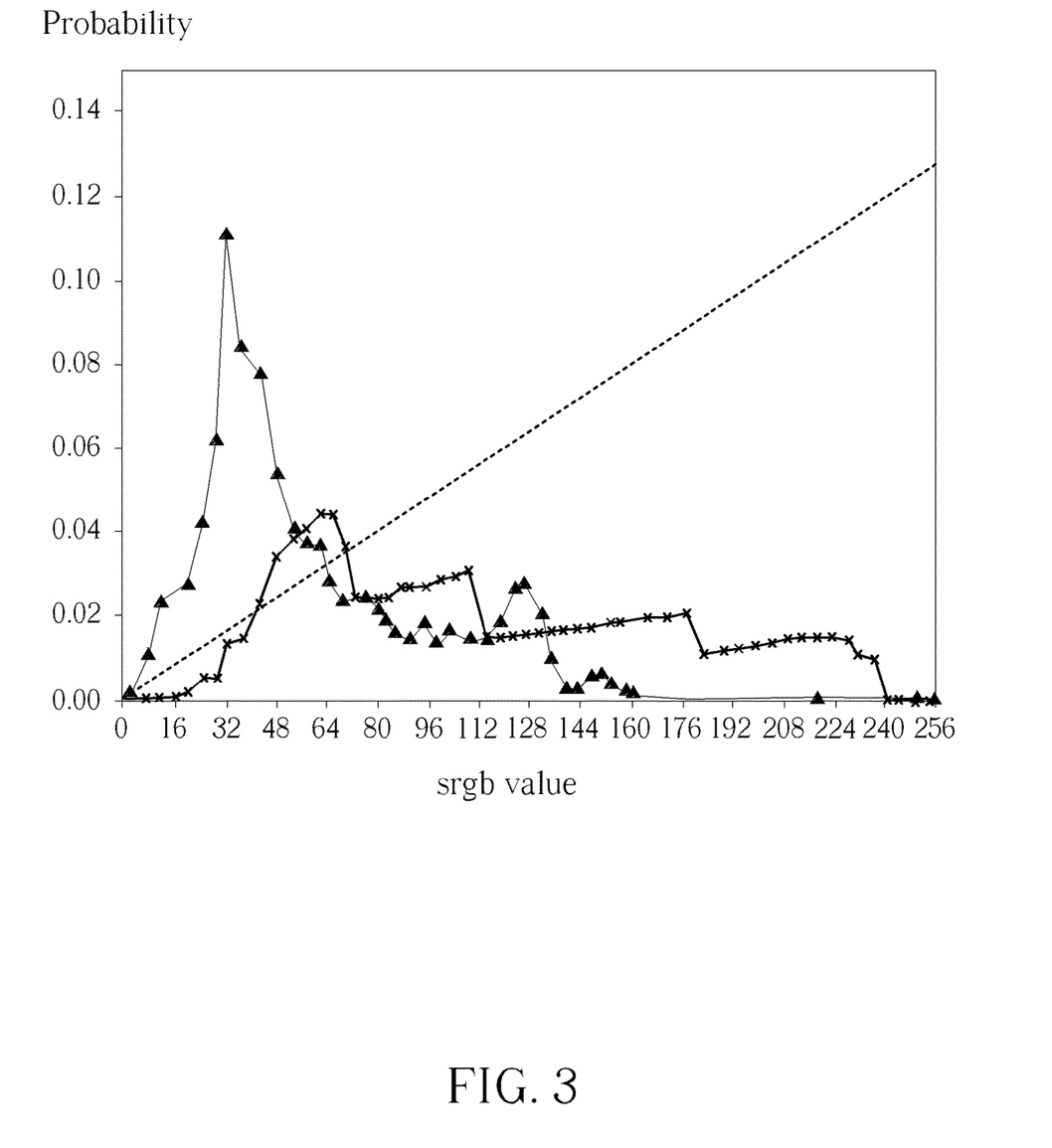
FIG. 3 is a schematic diagram of an equalized luminance statistics according to an embodiment of the present invention.

Please continue to refer to FIG. 3, which is a schematic diagram of the equalized luminance statistics according to an embodiment of the present invention. In FIG. 3, a dotted line represents a reference line, a triangle line represents the luminance statistics before equalized, and a cross line represents the equalized luminance statistics. After the equalization of the luminance statistics, in a range of 64 to 128 of SRGB values, the luminance statistics is equalized, so as to achieve better contrast and brightness of the image.

Then, the luminance statistics is further utilized for calculating the saliency distribution of a pixel brightness based on the luminance statistics. The saliency distribution may be further utilized for generating a histogram equalization curve, which may be a modification to the enhancing curve according to the target brightness and the noise level of the image, so as to enhance the contrast of the image. In an embodiment, the saliency distribution is related to a size of pixel groups, wherein each pixel group contains pixels with similar intensity of the image. More specifically, the saliency distribution of the image shows each pixel's unique quality in segmentation of the image. For example, if one of the pixels locates at a large and dark area in the image, the pixel's quality will show in an obvious way after the saliency of the luminance statistics of the image is derived.

In an embodiment, the saliency distribution of the image is derived from a power function of the probability density function of the luminance statistics of the image and the target noise. Equation (2) is utilized for calculating the saliency distribution of the intensity corresponding to each pixel:

$$\rho(i) = p_{max} \cdot \left( \frac{p(i) - p_{min}}{p_{max} - p_{min}} \right)^\gamma + \varepsilon, i \in [0, 255] \quad (2)$$

where $\gamma \in [0, 1]$, $\varepsilon = g(p_{max}, \text{target noise})$

Figure 4A:
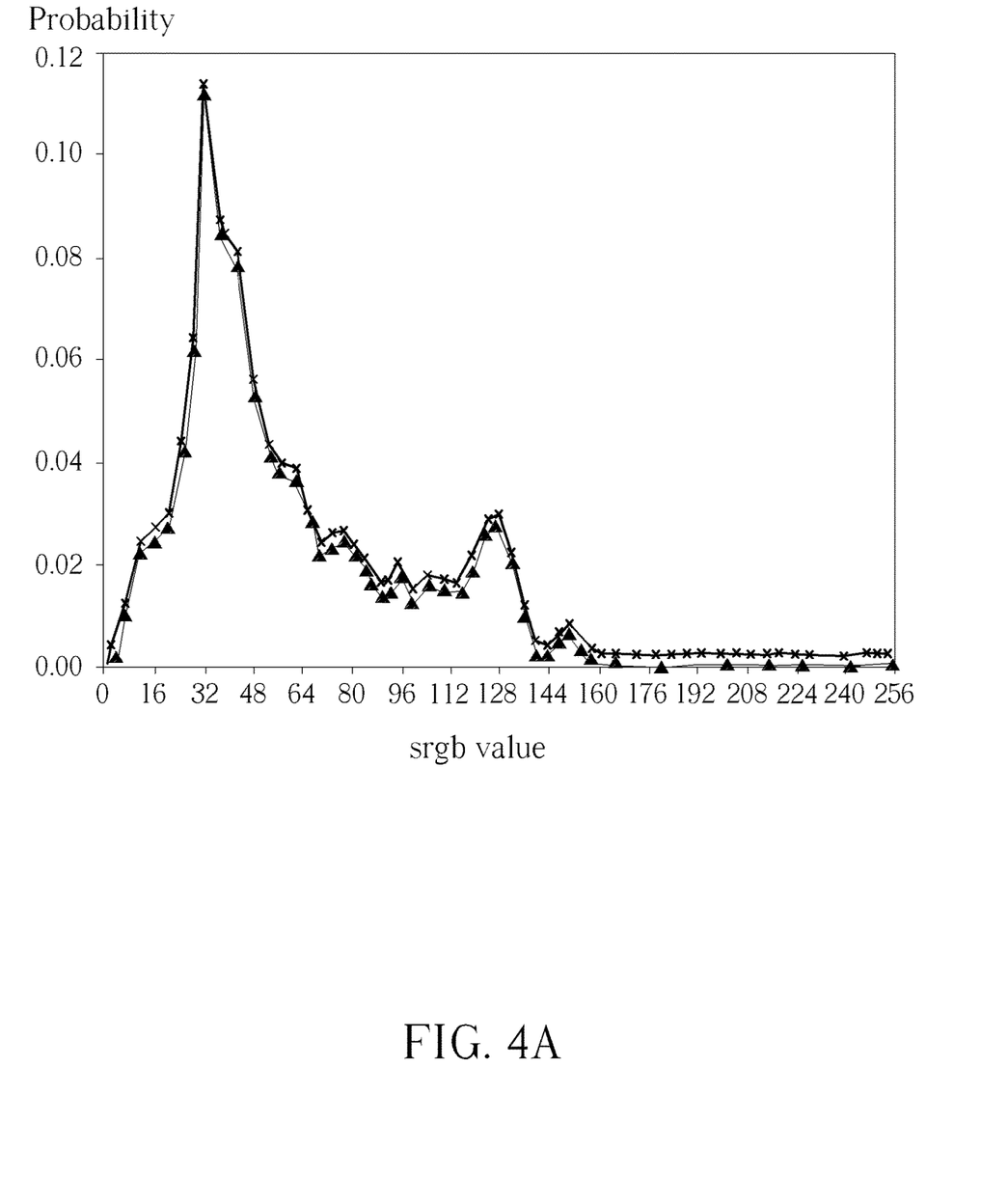
FIGS. 4A and 4B are schematic diagrams of the luminance statistics with different $\gamma$ of an enhancing curve according to an embodiment of the present invention.

In the equation (2), $\gamma$ denotes an exponential power ranging from 0 to 1, $\varepsilon$ denotes an offset function related to the target noise and a probability of a maximal brightness value of the luminance statistics and $\rho(i)$ denotes the enhancing curve of the equalized luminance statistics corresponding to the probabilities of the SRGB value. In an embodiment, the function of $\varepsilon$ is to eliminate effects caused by dominant noises, and is related to the probability of the maximal SRGB value of the luminance statistics and the target noise, wherein the target noise may be determined by the computer system or the users. $\gamma$ of $\rho(i)$ distributes the intensity of pixels in each segment of the luminance statistics. Please refer to FIGS. 4A and 4B for examples, which are schematic diagrams of the luminance statistics with different $\gamma$ of the enhancing curve according to an embodiment of the present invention. As shown in FIG. 4A, when $\gamma=1$, a triangle line is the pdf of the luminance statistics before applying the saliency distribution to the intensity corresponding to each SRGB value, and a cross line is the pdf of the luminance statistics after the saliency distribution to the intensity corresponding to each SRGB value is applied. Notably, when $\gamma=1$ and $\varepsilon=0$, $\rho(i)$ can be seen as p(i); therefore, the enhancing curve is almost the same after the saliency with $\gamma=1$ is calculated. In this situation, the distribution of the luminance statistics of the image almost remains the same.

Figure 4B:
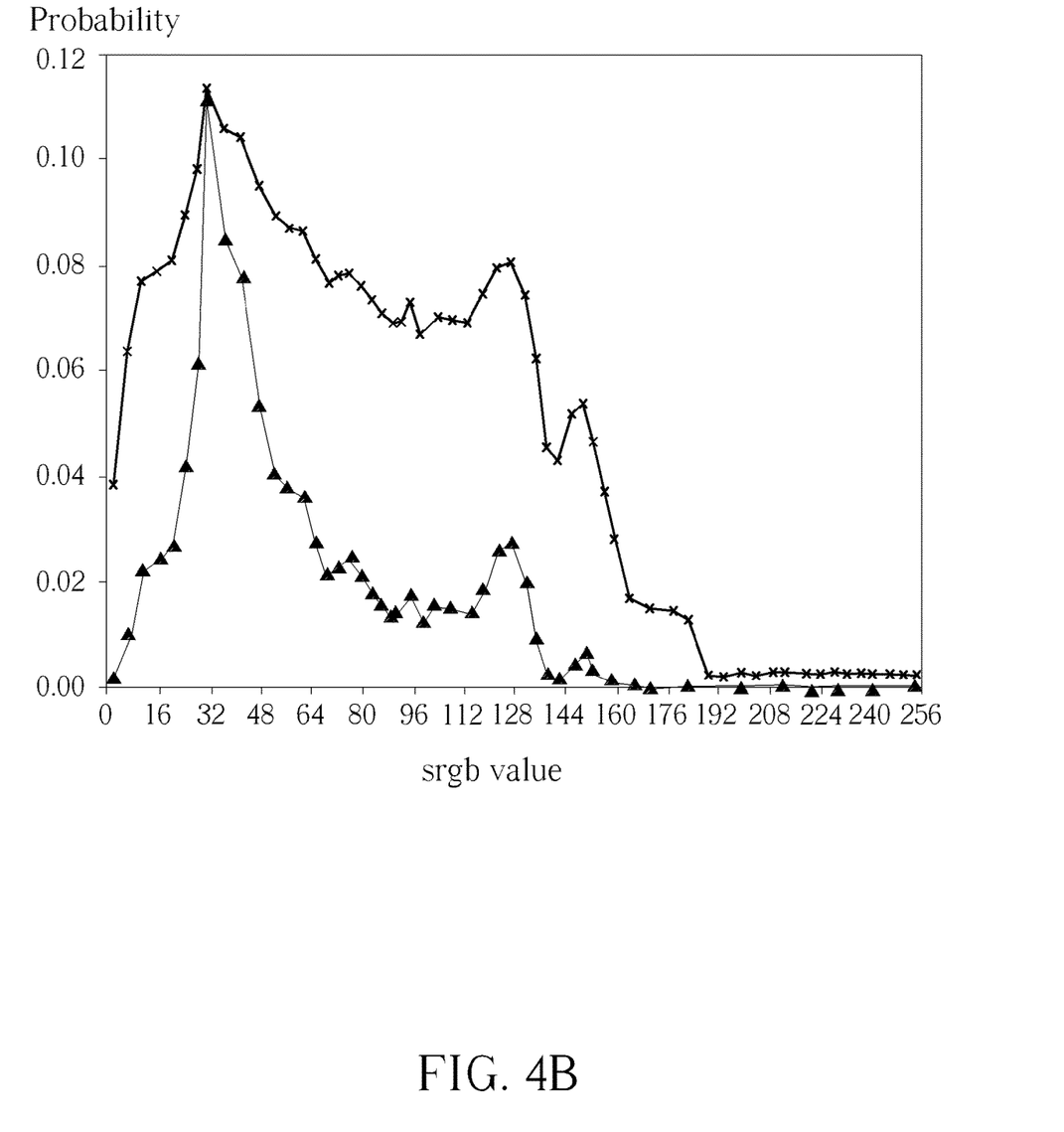

On the other hand, when $\gamma=0.25$, the triangle line is the pdf of the luminance statistics before applying the saliency distribution to the intensity corresponding to each pixel, and the cross line is the pdf of the luminance statistics after the saliency distribution to the intensity corresponding to each pixel is applied. As can be seen, the probability of luminance statistics corresponding to the SRGB values between 16 and 48 is properly distributed accordingly, which increases the contrast of image and refines more details for the image. Therefore, the enhancing curve applied with the saliency distribution of each segment according to the target noise and the weighted luminance statistics may improve the distribution of the pdf of the luminance statistics and reallocate the contrast of the image. As such, the image applied with the image enhancement process 10 of the present invention nay provide smoother image in contrast and brightness by controlling the noise and the contrast of the images.

After determining the enhancing curve by the weighted histogram and applying the saliency distribution to the intensity of each pixel, in step 110, the embodiment blends the boosting curve and the enhancing curve based on the enhance level to generate the control curve. The enhance level may be determined by the computer system or the users. In an embodiment, the enhancing curve and the boosting curve are weighted based on the enhance level, wherein the enhance level is related to a result of a scene analysis referring to at least one of the luminance statistics and an image tone. More specifically, equation (3) is utilized for determining the blending of the boosting curve and the enhancing curve based on the enhance level.

$$\xi(x)=\alpha \cdot f(x)+(1-\alpha) \cdot \rho(x),$$

$$\alpha = \text{tone enhancement level} \quad (3)$$

In equation (3), x denotes the brightness of each pixel of the image, f(x) denotes the boosting curve, ρ(x) denotes the enhancing curve and a denotes the enhance level, which is in a range of 0 to 1 and determined by a user or system requirements. The blending of the boosting curve and the enhancing curve generates the control curve according to the enhance level and the control curve is be applied on the image of the video to enhance the contrast and the brightness of the image based on the enhance level, the target noise and the target brightness.

Notably, the embodiments stated above illustrate the concept of the present invention, those skilled in the art may make proper modifications accordingly, and not limited thereto. For example, the image is not limited to the 8-bit three-channel RGB image, or the control curve may be determined based on at least one of the enhance level, the target noise and the target brightness, which belong to the scope of the present invention.

Figure 5:
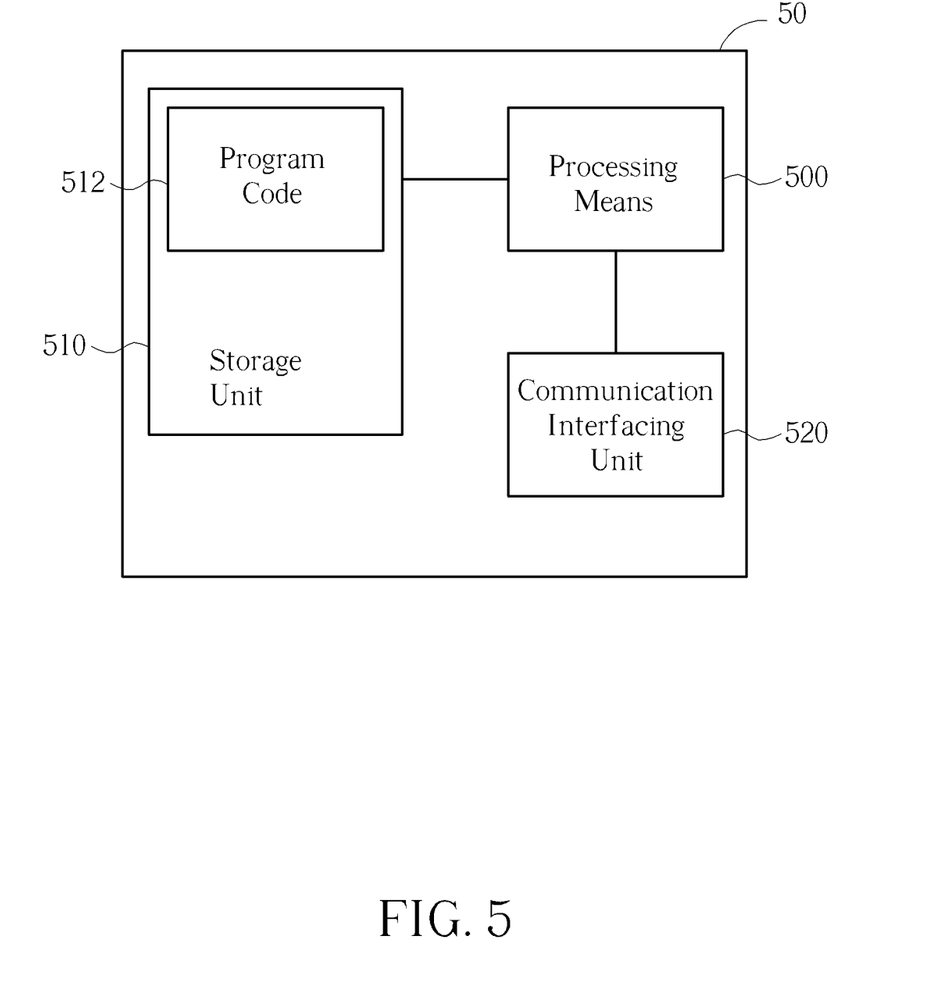
FIG. 5 is a schematic diagram of a computer system according to an example of the present invention.

In another embodiment, please refer to FIG. 5, which is a schematic diagram of a computer system 50 according to an example of the present invention. The computer system 50 may be utilized for realizing the image enhancement method stated above, but is not limited herein. The computer system 50 may include a processing means 500 such as a microprocessor or Application Specific Integrated Circuit (ASIC), a storage unit 510 and a communication interfacing unit 520. The storage unit 510 may be any data storage device that can store a program code 512, accessed and executed by the processing means 500. Examples of the storage unit 510 include but are not limited to a subscriber identity module (SIM), read-only memory (ROM), flash memory, random-access memory (RAM), CD-ROM/DVD-ROM, magnetic tape, hard disk and optical data storage device.

In summary, the image enhancement method of the present invention determines the control curve, which contains the boosting curve to boost the image in the brightness and the enhancing curve to improve the image in the brightness and the contrast, and thereby preserving more details for the image and improving quality of image for a temporal smoothing.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method of image enhancement in a video, comprising:
    acquiring a luminance statistics of an image;
    determining a boosting curve according to a target brightness and a brightness of the image;
    determining an enhancing curve according to a saliency distribution of a pixel brightness derived from the luminance statistics, to the target brightness and a noise level of the image;
    blending the boosting curve and the enhancing curve based on an enhance level to generate a control curve; and
    enhancing the image based on the control curve;
    wherein the control curve enhances the brightness and a contrast of the image.

2. The method of claim 1, wherein the boosting curve is determined by a power function.

3. The method of claim 1, wherein the brightness of the image is related to an intensity of a plurality of pixels of the image.

4. The method of claim 1, wherein the step of determining the enhancing curve according to the saliency distribution of the pixel brightness derived from the luminance statistics, to the target brightness and the noise level comprises:
    calculating the saliency distribution of the pixel brightness based on the luminance statistics;
    generating a histogram equalization curve according to the saliency distribution; and
    modifying the enhancing curve according to the target brightness.

5. The method of claim 4, wherein the saliency distribution of the pixel brightness is related to a size of a plurality of pixel groups, and each of the plurality of pixel groups contains a plurality of pixels with similar intensity.

6. The method of claim 1, wherein the saliency distribution of the pixel brightness of the image is derived from a power function of a luminance histogram of the image and a target noise, wherein the luminance histogram is related to the luminance statistics.

7. The method of claim 1, wherein the wherein the step of blending the boosting curve and the enhancing curve based on the enhance level to generate the control curve comprises:
    weighting the enhancing curve and the boosting curve based on the enhance level;
    wherein the enhance level is related to a result of a scene analysis referring to at least one of the luminance statistics and an image tone.

8. A computer system, comprising:
    a processing device; and
    a memory device coupled to the processing device, for storing a program code instructing the processing device to perform a process of image enhancement in a video, wherein the process comprises:
        acquiring a luminance statistics of an image;
        determining a boosting curve according to a target brightness and a brightness of the image;
        determining an enhancing curve according to a saliency distribution of a pixel brightness derived from the luminance statistics, to the target brightness and a noise level of the image;

blending the boosting curve and the enhancing curve based on an enhance level to generate a control curve; and enhancing the image based on the control curve;

wherein the control curve enhances a brightness and a contrast of the image.

9. The computer system of claim 8, wherein the boosting curve is determined by a power function.

10. The computer system of claim 8, wherein the brightness of the image is related to an intensity of a plurality of pixels of the image.

11. The computer system of claim 8, wherein the step of determining the enhancing curve according to the saliency distribution of the pixel brightness derived from the luminance statistics, to the target brightness and the noise level comprises:

calculating the saliency distribution of the pixel brightness based on the luminance statistics;

generating a histogram equalization curve according to the saliency distribution; and modifying the enhancing curve according to the target brightness.

12. The computer system of claim 11, wherein the saliency distribution of the pixel brightness is related to a size of a plurality of pixel groups, and each of the plurality of pixel groups contains a plurality of pixels with similar intensity.

13. The computer system of claim 8, wherein the saliency distribution of the pixel brightness of the image is derived from a power function of a luminance histogram of the image and a target noise, wherein the luminance histogram is related to the luminance statistics.

14. The computer system of claim 8, wherein the wherein the step of blending the boosting curve and the enhancing curve based on the enhance level to generate the control curve comprises:

weighting the enhancing curve and the boosting curve based on the enhance level;

wherein the enhance level is related to a result of a scene analysis referring to at least one of the luminance statistics and an image tone.

* * * * *